(12) United States Patent
Jenkins et al.

(10) Patent No.: US 7,253,727 B2
(45) Date of Patent: Aug. 7, 2007

(54) SECURITY CHECKPOINT

(75) Inventors: Anthony Jenkins, North Reading, MA (US); William J. McGann, Raynham, MA (US)

(73) Assignee: General Electric Company, Schenectady, NY (US)

( * ) Notice: Subject to any disclaimer, the term of this patent is extended or adjusted under 35 U.S.C. 154(b) by 226 days.

(21) Appl. No.: 10/886,952

(22) Filed: Jul. 8, 2004

(65) Prior Publication Data

US 2005/0057354 A1    Mar. 17, 2005

Related U.S. Application Data

(60) Provisional application No. 60/485,501, filed on Jul. 8, 2003.

(51) Int. Cl.
*G08B 19/00*    (2006.01)

(52) U.S. Cl. ............... 340/522; 340/573.1; 340/540; 340/521

(58) Field of Classification Search ............. 340/522, 340/552, 540, 573.1, 5.12, 5.3, 5.32, 5.7, 340/521, 541; 700/226, 229, 213; 73/23.2, 73/28.01
See application file for complete search history.

(56) References Cited

U.S. PATENT DOCUMENTS

| | | | |
|---|---|---|---|
| 4,137,567 A | | 1/1979 | Grube |
| 5,915,268 A | * | 6/1999 | Linker et al. ............. 73/23.2 |
| 6,137,895 A | * | 10/2000 | Al-Sheikh ................ 382/115 |
| 6,158,658 A | * | 12/2000 | Barclay ................... 235/384 |
| 6,192,287 B1 | * | 2/2001 | Solomon et al. ......... 700/110 |
| 6,662,078 B1 | * | 12/2003 | Hardgrave et al. ...... 700/226 |
| 6,952,163 B2 | * | 10/2005 | Huey et al. ............. 340/521 |
| 2003/0085348 A1 | | 5/2003 | Megerle | |

FOREIGN PATENT DOCUMENTS

| | | |
|---|---|---|
| DE | 24 50 567 | 1/1976 |
| DE | 101 63 123 A1 | 7/2003 |
| EP | 1 132 752 A2 | 9/2001 |
| EP | 1 245 952 A2 | 10/2002 |
| WO | WO 02/29744 | 4/2002 |

* cited by examiner

*Primary Examiner*—Anh V. La
(74) *Attorney, Agent, or Firm*—Gerald E. Hespos; Anthony J. Casella

(57) ABSTRACT

A security checkpoint includes a personal scanning portal, a parcel scanning portal and a controller for ensuring substantially simultaneous scanning of a person and the parcel associated with the person. The controller also adjusts the level of scrutiny at each portal based on scanned data received at the other portal and based on information in a database relating to the specific person at the security checkpoint.

22 Claims, 5 Drawing Sheets

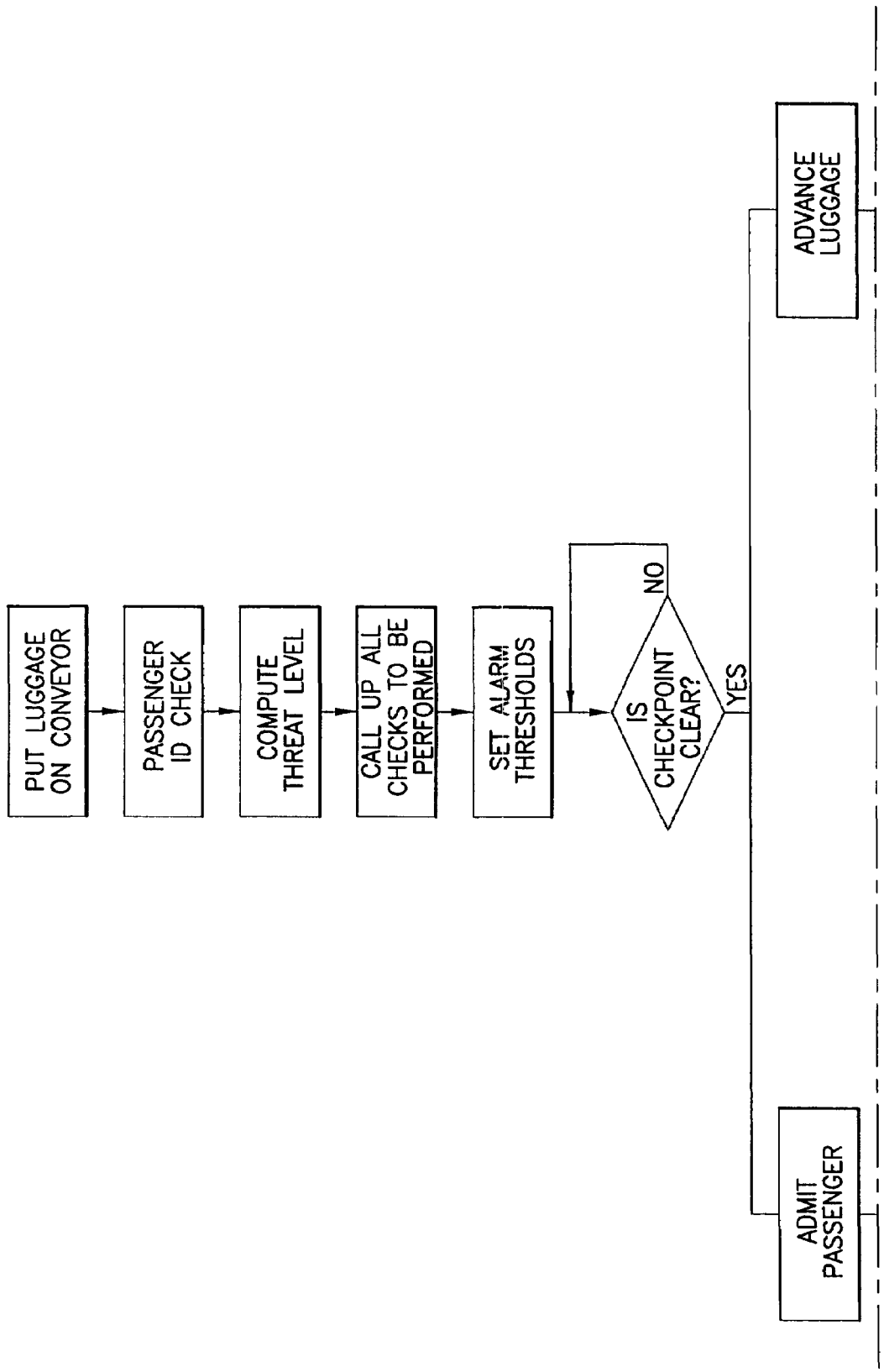

SECURITY CHECKPOINT

This application claims priority on U.S. Provisional Patent Appl. No. 60/485,501, filed Jul. 8, 2003.

BACKGROUND OF THE INVENTION

1. Field of the Invention

The invention relates to apparatus for coordinated screening of passengers and packages at security checkpoints.

2. Description of the Related Art

Many different types of devices have been developed for screening both people and parcels for weapons and other contraband. These are used at airports, government buildings and other high security locations. Additionally, security personnel employed at these locations have been trained to identify certain personal characteristics that may trigger a more detailed security investigation. For example, airline passengers may be subjected to a visual screening at the ticket check-in counter. The visual screening will assess the demeanor and nervous state of the passenger, the itinerary of the passenger, the method of payment for the ticket and in some instances the ethnicity of the passenger. A ticket agent may mark a boarding pass with a code that requests additional screening at a later checkpoint if the preliminary screening by the ticket agent suggests that a more detailed security review is appropriate.

The passenger then moves from the ticket counter to a security checkpoint between the ticket counter and the boarding gate. The typical security checkpoint requires the passenger to walk through a metal detector. Some airports also have a walk through detector that checks for the presence of trace amounts of substances of interest. One such detector is disclosed in U.S. Pat. No. 6,073,499 and is effective to determine whether the passenger is carrying or has recently handled explosives or narcotics. The passenger then proceeds towards the gate. All airlines require the passenger to show a boarding pass at the gate and perhaps some other form of identification. The boarding pass may have been marked by the ticket agent in a manner to indicate a need for further searching. In such cases, the passenger may be subject to increased scrutiny by being directed down a separate "selectee" lane at the checkpoint.

At the security checkpoint, carry-on luggage is placed on a conveyor belt and passed through an X-ray inspection apparatus shortly before the passenger walks through the metal detector. The conveyor belt of the X-ray inspection apparatus operates continuously unless stopped by the security personnel viewing the screen of the X-ray inspection apparatus. If necessary, the conveyor may be operated in reverse so that a piece of luggage can be re-inspected if the security personnel think they have seen an object that requires more than the initial passing glance. Many passengers have several items of carry-on luggage that are subject to X-ray inspection. The movement of these personal items of luggage through the X-ray inspection apparatus is performed entirely independently of the movement of the passenger through the metal detector. For example, a person will be delayed from entering the metal detector if a previous passenger has triggered the alarm of the metal detector. In such situations, the previous passenger will be asked to check pockets for metal objects, will deposit those objects in a tray for passage through the X-ray apparatus and then will be asked to walk through the metal detector again. This process can be repeated more than once and eventually that previous passenger may be subjected to a more direct screening by a handheld metal detector. During this time, the luggage of passengers who are delayed continues through the X-ray scanning apparatus. In many instances, a person's carry-on luggage will have been waiting at the outlet end of the X-ray scanning apparatus by the time the person has passed through the metal detector. In other situations, the passenger will have proceeded through the metal detector and must wait while the security personnel checks and rechecks images produced by the X-ray screening of a previous passenger's luggage. Thus, the movement of carry-on luggage and passengers through the security checkpoint occurs at approximately the same time, but entirely independent of one another. Furthermore, the checking of carry-on luggage by the X-ray apparatus and the security personnel who monitor the X-ray screen is carried out entirely independently of observations made by the ticket agent at the check-in counter.

Some carry-on luggage is subject to screening for explosives, narcotics or other contraband. These devices typically operate by wiping a soft flexible porous trap over the carry-on luggage. The trap is formed from a material that will entrain microscopic particles of interest. The trap then is placed in a detector that checks for the presence of explosives or narcotics. An apparatus of this type is disclosed, for example, in U.S. Pat. No. 5,491,337. The screening of luggage in this manner may be carried out randomly or based on observations by security personnel at the security checkpoint. Additionally, confusion at the outlet end of the X-ray screening apparatus often results in missed opportunities for more detailed screening.

In view of the above, it is an object of the subject invention to provide apparatus for a more coordinated screening of passengers and luggage at security checkpoints, and to improve security, reduce the average inspection time and reduce the cost of manning the checkpoint.

SUMMARY OF THE INVENTION

The subject invention relates to a security checkpoint that may be installed at airports, government buildings and other locations that require high levels of security. The security checkpoint includes a personal identification station, a personal scanning portal and a parcel scanning portal. For simplicity, the following summary relates to an airport security checkpoint where the people are passengers and the parcels are luggage.

The passenger identification station may include an input apparatus or input terminal. The passenger may be required to slide a boarding pass into or through a card reader. Alternatively or additionally, the passenger may be required to slide an identification card or credit card through a reader in much the same manner that e-ticketed passengers now present cards to an e-ticket printer. In still other instances, the screening apparatus may respond to physical characteristics of the passenger, such as fingerprints, hand dimensions or corneal characteristics. The passenger identification station functions to correlate the passenger at the checkpoint with data that may have been inputted by the ticket agent at the check-in location or at the self check-in facility. Additionally, this screening step can be coordinated with other information stored in databases maintained by airport security agencies. As a result, the level of checking at subsequent locations in the security checkpoint can be made with due consideration for observations made by the ticket agent at check-in or by information maintained in databases of security agencies or suspicious activity detected automatically by video sensing equipment.

The passenger scanning portal may include a known metal detector for detecting the presence of small metallic objects. In this regard, the metal detector may be of the type currently used at airports or a back scatter X-ray apparatus. The passenger portal may also include apparatus for detecting the presence of substances of interest on the person passing through the portal. In this regard, the passenger portal may include a detector of the type disclosed in U.S. Pat. No. 6,073,499. A metal detector and the chemical trace detection portal may be combined into a single portal or into two or more sequential portals through which each passenger will walk. The passenger portal may further include bulk substance detection such as provided by quadrapole resonance detection equipment.

The luggage portal may include an X-ray inspection apparatus with a monitor that can be observed by security personnel. The luggage scanning portal may also include apparatus for detecting the presence of trace amounts of particles of interest. In this regard, the apparatus that checks for trace amounts of particles of interest may be similar to the apparatus disclosed in U.S. Pat. No. 6,073,499. However, the apparatus for checking luggage cannot rely upon assistance from the upwardly flowing thermal plume that surrounds a passenger. Hence, the apparatus that checks luggage for trace amounts of particles of interest may include air jets or agitators to separate particles of interest from the luggage and may include an air pump or fan for generating a flow of air that will deliver the trace amounts of particles of interest to a detecting apparatus. The detecting apparatus may be of the type disclosed in U.S. Pat. No. 5,491,337. The luggage portal may include bulk substance detection equipment such as a quadrapole resonance detector.

The checkpoint further includes apparatus for coordinating the screening of passengers and the screening of luggage. The coordinating apparatus may include an egress controller for selectively stopping or permitting movement of a passenger through the passenger portal. The egress controller could be an optical signal generator, such as green or red lights that can be illuminated alternately in accordance with appropriately generated signals or illuminated signs that will instruct a passenger to stop or proceed. The egress controller may also include an auditory signal generator, such as a taped signal that instructs a passenger to proceed beyond the control point at a selected time in the coordinated passenger and luggage screening process. The passenger controller may also include an alarm signal to indicate when a passenger has advanced beyond the passenger control point without a proper signal to proceed. The alarm signal can be an illumination or a sound. The passenger egress controller may also include a physical barrier, such as a gate or door that is opened in response to a selected signal from the controller.

The coordinating apparatus may further include a segmented conveyor for feeding carry-on luggage into the luggage portal. The segmented conveyor may include markings or three dimensional dividers on the conveyor for identifying discreet conveyor sections for items of luggage. Alternatively or additionally, separate segmentors may be mounted on the conveyor by the passenger or by security personnel in much the same manner as dividers are placed between orders of groceries at a food store. Another alternative would tag the luggage with, for example, an RFID tag which contains the identity of the passenger. Such tags would be issued at check-in and attached to the passenger carry-on bags.

The conveyor does not operate continuously, but rather operates incrementally from one segment of the conveyor to the next. The conveyor will function to advance from one segment to the next only in coordination with the advancement of passengers through the passenger scanning portal. Conversely, the passenger egress controller will operate synchronously with the incremental advancement of the conveyor in the luggage portal. Movement of the passenger through the passenger portal will be delayed while the screening of the luggage is being completed. Thus, the passenger and the luggage will be permitted to proceed simultaneously only after both screening processes have been completed.

The outlet from the passenger portal and the outlet from the luggage portal preferably are in proximity to one another. Thus, a passenger need only make a few steps from the egress of the passenger portal to the egress of the luggage portal. Additionally, the passenger will be approaching the outlet from the luggage portal substantially as the intermittently operated conveyor feeds the passenger's luggage from the luggage scanning portal.

Some luggage may be targeted for further more detailed inspection. Such inspection may be carried out by the above-described devices that employ soft flexible porous traps for collecting minute traces of particles of interest.

The decision to subject luggage to further testing may be made based on observations by the ticket agent at check-in, employees at the security checkpoint or information stored in the databases maintained by security agencies. The decision to subject luggage for further testing may also be made by the security operator as a result of the initial screening. In these situations, the carry-on luggage will not be made available immediately to the passenger exiting from the passenger portal. Rather, the passenger will proceed to the location where the additional luggage screening is carried out. The movement of the carry-on luggage to the location for further screening may be carried out manually by security personnel at the checkpoint. Alternatively, the conveyor may include a shunt or detour apparatus for automatically diverting luggage that has been targeted for further checking. The conveyor detouring apparatus may be similar to the detouring devices employed on conveying systems, such as those used at postal facilities. The additional checking carried out beyond the initial luggage portal can be a hand checking. For this purpose, the station for hand checking may include a monitor that communicates with the monitor employed at the luggage portal, such as the X-ray inspection monitor of the luggage portal. The monitor may identify specific locations in the luggage that should be checked.

The passenger identification station may further comprise a control apparatus for coordinating scanning carried out with respect to the passenger and scanning carried out with respect to the luggage. In this regard, the controller ensures that luggage is subjected to increased scrutiny in all instances where the passenger is targeted for increased scrutiny. Conversely, the controller ensures that a passenger is subjected to increased scrutiny in all situations where the luggage has been targeted for increased scrutiny. Thus, the controller ensures that luggage will not pass through the luggage screening portal with a low level of scanning sensitivity when human or machine generated signals target the passenger for increased scrutiny. The controller may function to increase the sensitivity of the passenger scanning portal and/or the luggage scanning portal in response to a sensed need for increased security at either of the two portals. Alternatively, the controller may function to generate a signal that instructs security personnel to carry out hand screening of luggage in those situations where a passenger has been targeted for hand screening. Similarly, the controller may instruct security personnel to conduct more direct personal screening of a passenger in those situations where the luggage has been targeted for more direct screening. The conditions that will trigger the greater scrutiny may vary from one situation to another and may depend upon the security alert level. For example, the passenger identification station may identify a particular country of origin for a passenger. Such a signal could generate a high level of scrutiny at both the passenger portal and the luggage portal. In this manner, an identical or similar level of screening scrutiny is maintained at all parts of the security checkpoint for a passenger and for luggage being transported by the passenger.

The preceding description employs the terms "passenger" and "luggage" to describe certain aspects of the security checkpoint. However, as noted above, the security checkpoint can be used in environments other than transportation hubs. Accordingly, the passenger scanning portal can be employed to check employees, visitors, or vendors at virtually any type of building. Similarly, the luggage scanning portal can be used to scan parcels other than luggage. In this regard, the luggage scanning portal can be used to scan mail, supplies and equipment.

DETAILED DESCRIPTION OF THE PREFERRED EMBODIMENT

Figure 1:
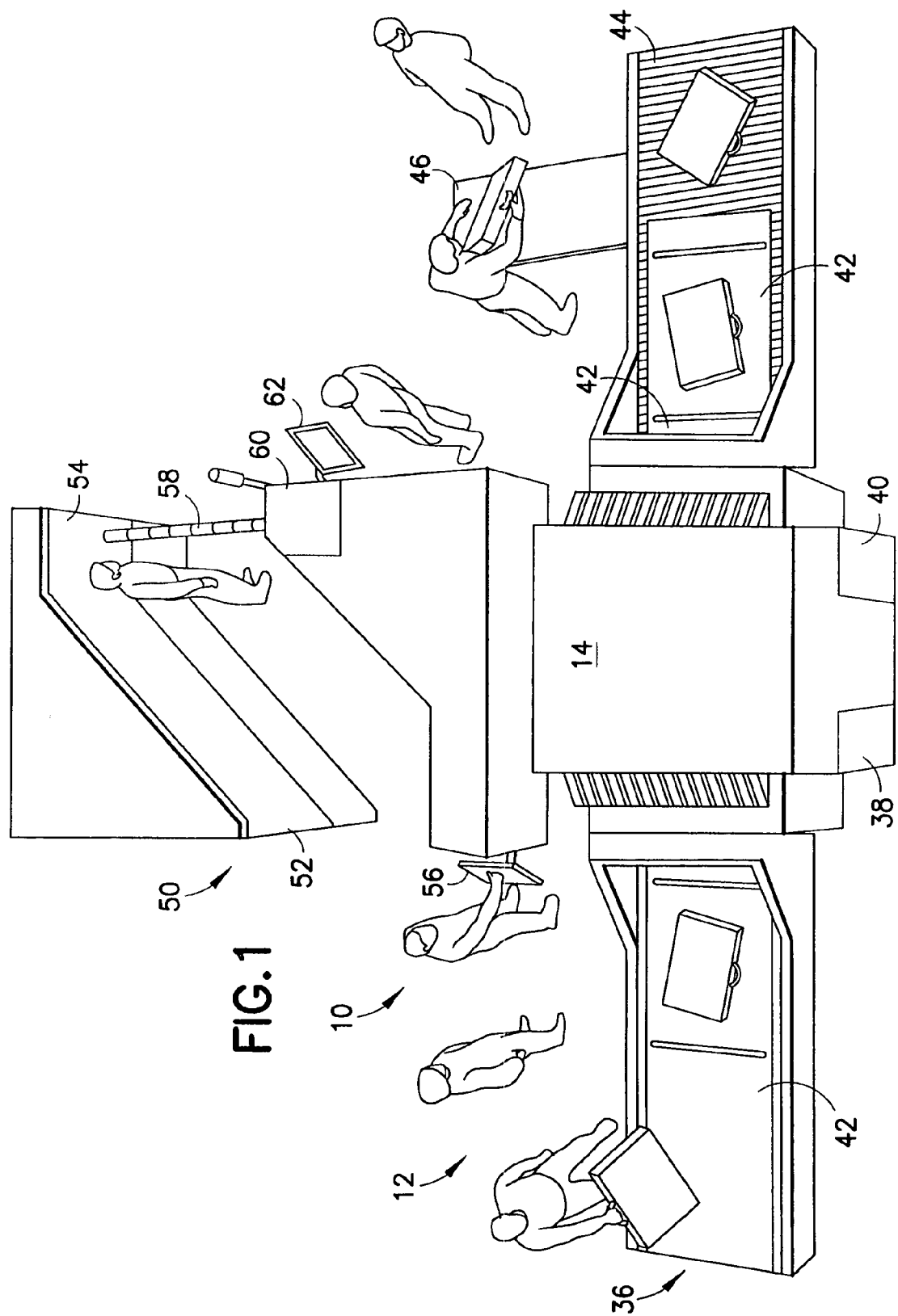
FIG. 1 is a schematic view of a checkpoint apparatus in accordance with the subject invention.

A security checkpoint in accordance with the subject invention is identified generally by the numeral 10 in FIG. 1. The checkpoint 10 includes a luggage inspection portal 12 that has a detector 14. The detector 14 preferably includes at least one X-ray inspection device as used currently at airports, and preferably at least two X-ray inspection devices for imaging a parcel from at least two different angles. The detector 14 further includes an explosive detector, such as an ion trap mobility spectrometer (ITMS) as shown in U.S. Pat. No. 5,491,337 and in FIG. 2. Additionally, the detector 14 includes a vibrator for imparting a vibration to the luggage for purposes of separating particles of interest from the luggage. The detector 14 may further include air jets for separating particles of interest from the luggage.

Figure 2:
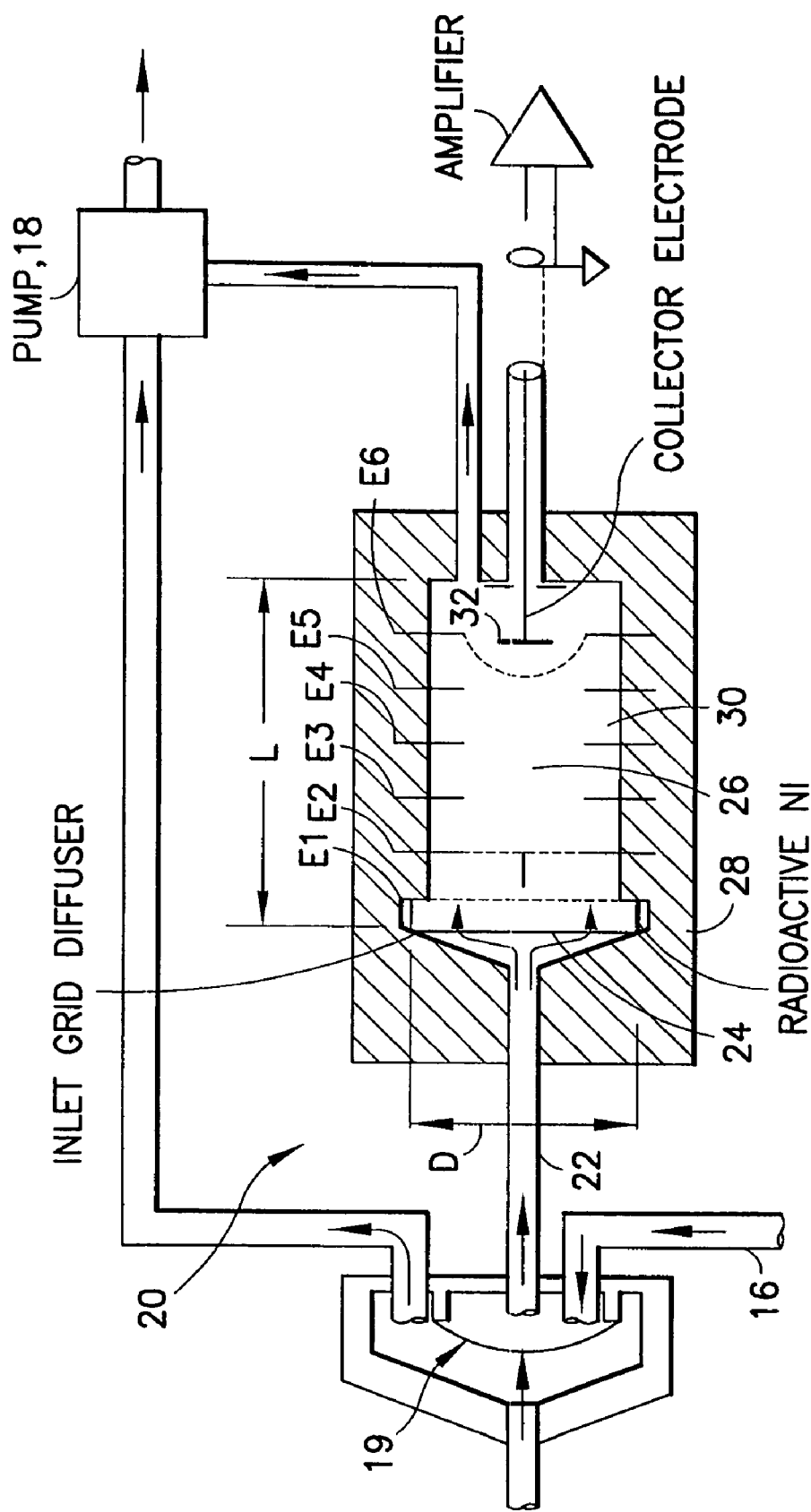
FIG. 2 is a schematic view of an ion trap mobility spectrometer for use in the luggage portal or the passenger portal of the checkpoint shown in FIG. 1.

The ITMS of FIG. 2 comprises a cylindrical detector 20 having an inlet 22 at one end for receiving sample air of interest borne by a carrier gas that has been doped with a low concentration vapor (typically a few parts per million) employed as a charge transfer mediator. More particularly, the inlet 22 communicates with a source of sample air of interest and a supply of carrier gas and dopant 16. Flows of gases to the inlet 22 are enabled by a flow generator, such as a pump, illustrated schematically and identified by the numeral 18 in FIG. 2. A heated membrane 19 is disposed near the inlet 22 and in communication with the source of the sample of air for blocking passage of at least selected constituents of the air and for enabling passage of other constituents of the air, including the constituents of interest. The heated membrane preferably is formed from a microporeous refractory material or from dimethyl silicone. The sample air, carrier gas, and dopant molecules pass through the inlet 22 and are spread by a diffuser 24 into an ionization chamber 26. The ionization chamber 26 is in the form of a shallow cylinder with a diameter D, length L, and cylindrical wall 28 of a radioactive material, e.g., nickel$^{63}$ or tritium, which emits beta particles. Inlet 22 communicates with one end of the ionization chamber 26. A grid electrode $E_1$ is provided at the end opposite the inlet 22, and is normally maintained at the same potential as the inlet end and the walls of the ionization chamber 26. Thus a largely field-free space is provided in which electrons and ion charges build up and interact with the sample molecules under bombardment by the beta-particles from the radioactive walls. Beyond the ionization chamber 26, the ionized sample gases pass through open electrode $E_1$ and into an ion drift region 30 having several field-defining electrodes $E_2$-$E_n$. A collector electrode or plate 32 is disposed at the end of the drift region 30 for receiving the ion samples reaching that end.

Periodically a field is established across the ionization region 26, by creating a potential difference between the grid electrode $E_1$ and the inlet diffuser 24 and radioactive source 28, for about 0.1-0.2 mS, to sweep the ions through the open grid $E_1$ into the drift region 30 with the assistance of the switching of the field between electrodes $E_1$ and $E_2$. The ions in the drift region 30 experience a constant electric field, maintained by the annular electrodes $E_2$-$E_n$, impelling them along the region and down toward the collector electrode 32. The electrode 32 detects the arriving charge, and produces signals that are amplified and analyzed through their spectra in the spectrometer. The gases exit through an outlet in the wall next to the electrode 32. After about 0.2 mS the field across the ionization region 26 is again reduced to zero and the ion population is again allowed to build up in the chamber 26 preparatory to the imposition of the next field. The polarity of the fields is chosen on the basis of whether the detector is operated in a negative or positive ion mode. When detecting explosives, a negative ion mode is usually appropriate, but when detecting narcotic samples positive ion mode is preferred.

The baggage inspection portal 12 further includes a conveyor 36. The conveyor 36 is powered by a motor 38 that is illustrated schematically in FIG. 1, and is operative intermittently to feed, stop and then feed again. The intermittent operation of the motor 38 is controlled by a control unit 40 and can be overridden by manual control signals generated by an operator. The conveyor 36 further includes separators 42 for separating the luggage of one passenger from luggage of another passenger. The separators 42 can be incorporated integrally into the conveyor 36 at specified distances from one another. Alternatively, the separators 42 can be placed on the conveyor by the operator, thereby reflecting the fact that different passengers will require different space on the conveyor 36 for their luggage. Hence, the operator can place the separator 42 at appropriate locations between the luggage of one passenger and the luggage of the next. Alternatively, all items entering the baggage inspection portal are tagged with an RFID tag.

The detector 14 further includes a reader, such as an optical reader for identifying the separators 42 and generating a signal in response to the sensed presence of a separator 42 for stopping the conveyor 36 until an override signal is generated. Alternatively, the reader is an RFID tag reader. The outlet end of the conveyor is adjacent a cleared bag pick-up station 44. The passenger may retrieve a cleared item of luggage at the pick-up station 44. A search station 46 is adjacent the pick-up station, and in proximity to the outlet end of the conveyor 36. The search station 46 is used for luggage that requires a hand check based on the results of prior screening either in the detector 14 or based on screening data of the passenger.

Figure 3:
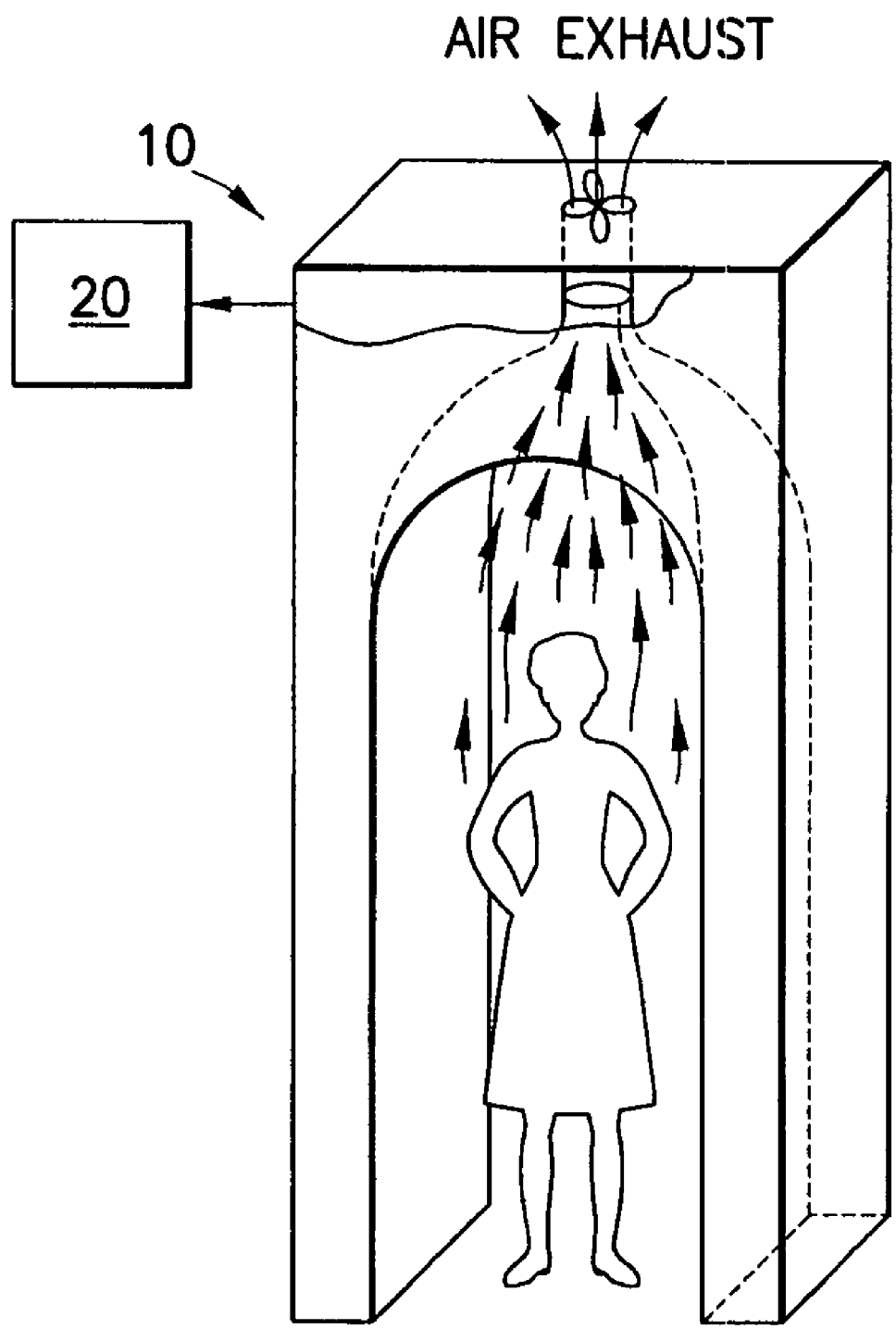
FIG. 3 is a schematic view of a walk through portal for screening passengers.

The checkpoint 10 further includes a passenger screening portal 50 with an inlet end 52 and an outlet end 54, as shown in FIGS. 1 and 3. The inlet end 52 includes an identification terminal 56 that requires each passenger to present some form of identification. The identification presented at the terminal 56 can be a boarding pass, a credit card, or the like. Alternatively, the identification terminal can read finger prints, hand sizes or corneal patterns. The identification terminal 56 preferably includes both visual and voice prompts to instruct each passenger of the actions required and when to proceed further beyond the inlet end 52 of the passenger screening portal 50. The visual and voice prompts produced by the identification terminal 56 will instruct the passenger when to proceed into the passenger portal 50.

The passenger portal 50 illustrated in FIG. 1 includes a back scatter X-ray device. The back scatter X-ray device may use commercially available technology to produce an X-ray screening for identifying the presence of threat objects and indicating the location of such objects. Additionally, the passenger portal 50 may include a detector for detecting the presence of trace amounts of narcotics, explosives or other substances of interest. The detector may be substantially in accordance with the provisions of U.S. Pat. No. 6,373,499, and hence may rely upon the thermal plume generated by the body heat of each passenger. The plume rises upwardly and entrains microscopic particles of substances of interest that may have been handled by the passenger. For this purpose, at least a portion of the passenger portal 30 may include a ceiling for receiving the thermal plume of air generated by the patient, as shown schematically in FIG. 3.

The outlet end 54 of the passenger portal 50 includes a traffic arm or door 58 that will control the egress of the passenger from the passenger portal 50.

The checkpoint 10 further includes a control unit identified generally by the numeral 60 in FIG. 1 and a monitor 62 that can be operated by security personnel. The control unit 60 receives signals from the identification terminal 56 and from a remote check-in location (not shown). The check-in location will be operated by a ticketing agent trained to identify passenger travel or personal characteristics or traits that may be indicative of a need for further searching. For example, a ticket-in agent may identify a particularly nervous or short-tempered passenger or a passenger that is perspiring without apparent environmental cause. Additionally, the check-in agent may notice certain travel characteristics, such as a cash purchase of a ticket, a one-way ticket purchased shortly before flight or travel to or from areas that have been identified as being a potential source of terrorists or contraband. Additionally, the initial ticketing or check-in can compare the name of the passenger with a database of names of passengers that require further checking.

The control unit 60 communicates with the identification terminal 56 and compares the identity of the passenger who is about to enter the passenger portal 50 with input received from the check-in agent or from the scan of known databases. The control unit 60 then generates a signal which indicates the calculated threat level of the passenger. This threat level may be used to adjust the intensity and duration of the tests carried out automatically by the checkpoint. For known passengers, some of the tests may be forgone completely. Also automatic alarm levels may be adjusted up and down within the portal to ignore certain levels of threat. For example, the alarm level of the weapons detector may be set to ignore small metallic objects such as coins on passengers with low threat levels. In this way, the testing time may be reduced while still maintaining high security. Thus the passenger and the corresponding baggage will be subject the same levels of screening.

The calculated threat level can also be viewed by the operator at the monitor 62. The results of the x ray scan and the passenger scan may be displayed on the monitor, so that perceived high threat passengers may be subject to increased scrutiny. Also, automatic detection devices may be deployed to scan the x ray image and passenger weapons detection images or outputs and will determine if any threat exists. Only doubtful images will be presented for operator resolution on the monitor 62.

Some of the inspection processes may be automatically called up by the control unit operating on the perceived threat from the particular passenger or by setting global threat levels communicated from security services. For example, the explosive check on luggage may not be carried out at a time of low threat or for perceived low threat passengers. Such automatic decisions will be transparent to the passenger.

Figure 4:
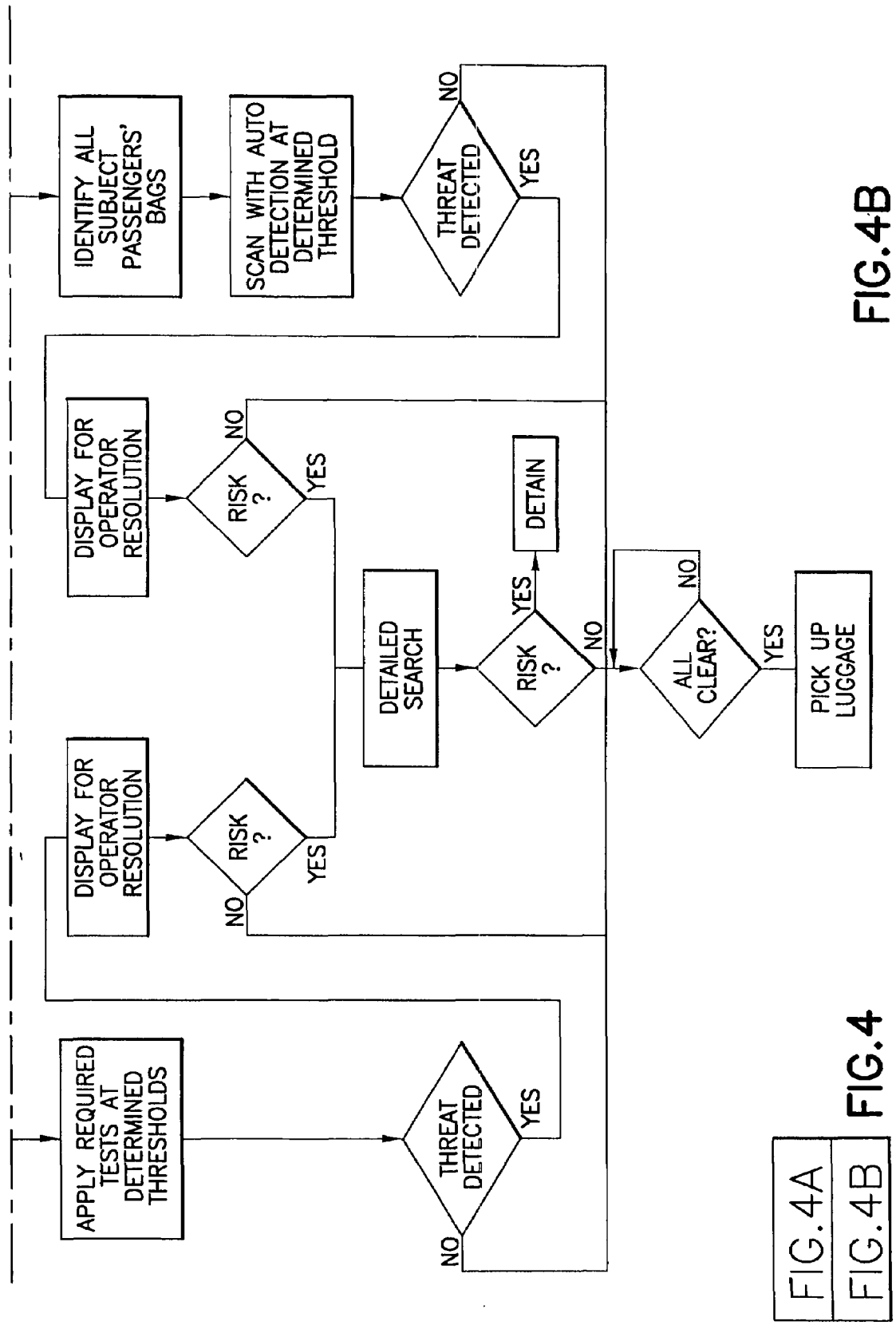
FIG. 4 is a flow diagram of the screening process.

The control unit 60 further communicates with both the motor 38 for the conveyor 36 and with the traffic arm 58. The control unit 60 will generate a signal for operating the traffic arm 58 only when the scan of the luggage associated with a particular passenger has been completed. Thus, the passenger and the luggage associated with the passenger will be advanced simultaneously to the outlet ends of the luggage inspection portal 12 and the passenger inspection portal 50. In most situations, the passenger will proceed directly from the outlet end 54 of the passenger portal 50 to the luggage pick-up station 40. However, in certain instances signals received by the controller 60 or determined by the operator as a result of the checkpoint testing may indicate a need for further searching of the luggage and/or the passenger. In these situations, a search officer will remove the luggage from the luggage pick-up station 44 to the luggage search station 46 so that additional searching can be carried out. This procedure is illustrated in the flow chart of FIG. 4. The corresponding passenger also will be searched or scanned with a degree of scrutiny consistent with the searching or scanning applied to the luggage.

What is claimed is:

1. A security checkpoint comprising:
   a parcel inspection apparatus for inspecting parcels for objects and materials of interest;
   a personal inspection apparatus in proximity to the parcel inspection apparatus for checking people individually for objects and materials of interest, the personal inspection apparatus including an identification terminal for inputting personal identification data prior to entry of each said people into the personal inspection apparatus; and
   a controller for controlling the inspections of the parcel and personal inspection apparatus and controlling the progress of parcels through the parcel inspection apparatus and progress of people through the personal inspection apparatus so that said progress of said parcels and said people occur substantially synchronously with one another, the controller communicating with the identification terminal of the personal inspection apparatus for controlling the personal inspection apparatus and the parcel inspection apparatus based on personal identification information inputted at said identification terminal.

2. The checkpoint of claim 1, wherein the parcel inspection apparatus includes an X-ray apparatus for identifying threat objects in the parcels.

3. The checkpoint of claim 2, wherein the parcel inspection apparatus includes apparatus for detecting substances of interest.

4. The checkpoint of claim 3, wherein the apparatus for detecting substances of interest includes an ion mobility spectrometer.

5. The checkpoint of claim 4, wherein the ion mobility spectrometer is an ion trap mobility spectrometer.

6. The checkpoint of claim 3, wherein the substance detector is a quadrapole resonance detection system.

7. The checkpoint of claim 1, wherein the personal inspection apparatus includes a metal detector for detection of weapons.

8. The checkpoint of claim 1, wherein the personal inspection apparatus includes a back scatter X-ray device for detection of weapons.

9. The checkpoint of claim 1, wherein the personal inspection apparatus includes an apparatus for detecting substances of interest.

10. The checkpoint of claim 9, wherein the apparatus for detecting substances of interest include an ion mobility spectrometer.

11. The checkpoint of claim 10, wherein the ion mobility spectrometer is an ion trap mobility spectrometer.

12. The checkpoint of claim 9, wherein the apparatus for detecting substance of interest is a quadrapole resonance detection system.

13. The checkpoint of claim 1, wherein the parcel inspection apparatus includes a conveyor for feeding parcels through the parcel inspection apparatus, the conveyor having separators applied thereto for separating parcels of one person from another, the parcel inspection apparatus being operative for identifying the parcel separators and for generating signals to the controller for coordinating egress of each person with parcels associated with the respective person.

14. The checkpoint of claim 1, wherein the controller further communicates with at least one external source of data for comparing search parameters from external sources of data to personal identification data inputted at said identification terminal.

15. The checkpoint of claim 14, wherein the controller sets alarm levels and test processes in response to the determined threat profile of the passenger.

16. The checkpoint of claim 1, wherein the controller is operative for receiving signals from the parcel inspection and the personal inspection apparatus indicative of materials of interest, the controller further being operative for generating signals for increasing scrutiny at least one of the parcel inspection apparatus and the personal inspection apparatus based on a sensed presence of an item of interest or a substance of interest at either of the luggage inspection apparatus and the passenger inspection apparatus.

17. A method for checking security at a security checkpoint, said method comprising:
 determining an identity of a person at the security checkpoint;
 comparing the identity of the person to previously inputted data identifying persons requiring increased scrutiny at the checkpoint;
 computing a personal threat profile;
 setting the levels of inspection of the check point apparatus to meet the level of scrutiny consistent with the computed threat profile;
 advancing the person through a personal scanning portal while simultaneously advancing any parcel carried by the person through a parcel scanning portal;
 substantially simultaneously scanning the person and any parcel transported by the person with a level of scrutiny determined at least partly by previously inputted data pertaining to the identity of the person.

18. The method of claim 17, further comprising increasing the level of scrutiny carried out at the personal scanning portal based on results of scanning carried out at the parcel scanning portal.

19. The method of claim 18, further comprising adjusting the level of scrutiny carried out at the parcel scanning portal based on results of scanning carried out at the personal scanning portal.

20. The method of claim 17, wherein the step of inspecting parcels includes vibrating the parcels to aspirate the parcel and dislodge substances of interest.

21. The method of claim 20, wherein the step of inspecting parcels further comprises inducing a flow of air in proximity to the parcel for dislodging and transporting substances of interest.

22. The method of claim 17, further comprising applying an RFID tag to the parcel and wherein the step of advancing the person through the personal scanning portal and simultaneously advancing the parcel through the parcel scanning portal comprises comparing the identity of the person to data on the RFID tag.

* * * * *